Figure 1:
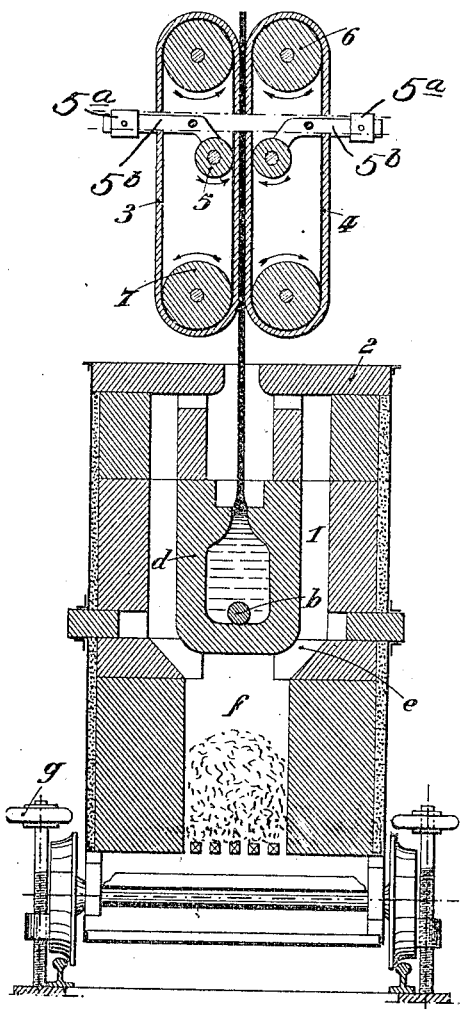

No. 837,212. PATENTED NOV. 27, 1906.
E. FOURCAULT.
APPARATUS FOR THE MANUFACTURE OF CONTINUOUS SHEETS OF GLASS
APPLICATION FILED OCT. 30, 1905.

2 SHEETS—SHEET 2.

UNITED STATES PATENT OFFICE.

EMILE FOURCAULT, OF LODELINSART, BELGIUM.

APPARATUS FOR THE MANUFACTURE OF CONTINUOUS SHEETS OF GLASS.

No. 837,212.   Specification of Letters Patent.   Patented Nov. 27, 1906.

Application filed October 30, 1905. Serial No. 285,189.

*To all whom it may concern:*

Be it known that I, EMILE FOURCAULT, glass manufacturer, a subject of the King of Belgium, residing at Lodelinsart, Belgium, have invented certain new and useful Improvements in Apparatus for the Manufacture of Continuous Sheets of Glass, of which the following is a specification.

In the apparatus for drawing upwardly a continuous sheet of glass there is provided generally a little fixed reservoir, always in communication with the glass-melting hearth. If this fixed reservoir must be repaired or transformed, the repair or transformation cannot be effected without disturbing the working of the melting-hearth. For preventing this disadvantage and for easily modifying the level of the glass in the little reservoir of the drawing apparatus and for regulating thus the flow of the glass through the slot of the float on the reservoir I have constructed the apparatus forming the object of this invention.

Figure 2:
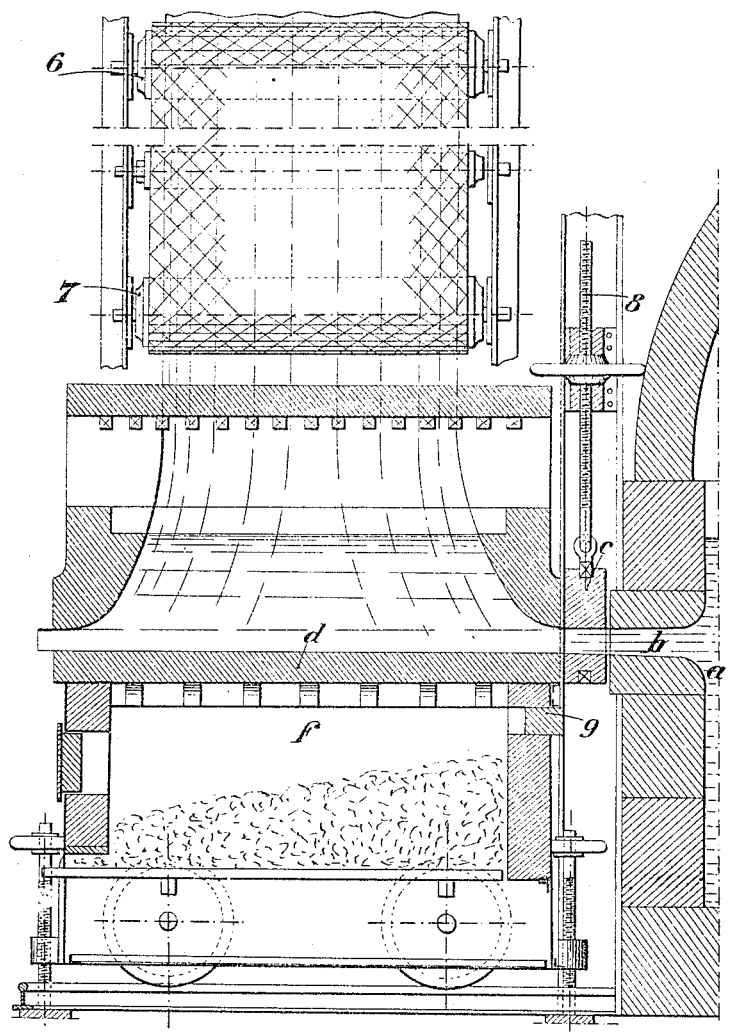

Figures 1 and 2 show in section at right angles to each other a portable apparatus mounted on wheels.

The apparatus communicates with the glass-melting hearth $a$ through a small opening $b$, which can be closed and opened by a sliding damper $c$. A suitable recess or reservoir in a piece of refractory material $d$ receives the molten glass and delivers it in the form of a continuous sheet or plate. The said piece of refractory material $d$ rests on brackets $e$ above a furnace $f$, which maintains the glass in the required state of fluidity. The hot gases from this furnace pass through vertical passages 1 and heat the side of the said refractory piece $d$ and issue through a series of small holes 2 on each side of the sheet or plate of glass that is being formed, so that the sheet or plate of glass and the base of the annealing apparatus are heated.

Screw-jacks $g$ allow the apparatus to be raised and lowered, so as to keep the slot in the refractory piece a little lower than the level of the glass in the melting-hearth $a$, and thus regulate the speed of flow of the molten glass. In this arrangement the drawn sheet or plate of glass passes between two sheets of metal or wire-gauze 3, to which are attached asbestos millboards 4, so that the metal sheet or wire-gauze and the asbestos millboards constitute practically two broad belts which may be situated in a channel or be exposed to the open air, as the asbestos millboards will prevent the sheet or plate of glass from cooling too rapidly. Small rolls 5 press the sheet or plate of glass between the asbestos millboards 4 by means of springs or counterweights, as at $5^a$, upon pivoted arms $5^b$. The upper rolls 6, over which the aforesaid bands pass, are driven by any suitable motor, (not shown in the drawings,) while the lower rolls 7 act as tension-rolls. As the apparatus is mounted on wheels, it is easy to bring it against the hearth $a$ and to remove it for repairs or other purpose. When this portable apparatus is removed, the opening $b$ from the hearth, through which the molten glass is taken, is closed by operating the damper $c$ by the screw 8. Another apparatus is then brought against the damper $c$ just opposite the opening $b$ from the melting-hearth, and a plug 9 in an opening from the furnace of the portable apparatus is removed to allow some of the furnace-heat to heat the damper $c$ and melt any glass that has become solidified between the damper $c$ and the refractory block $d$. As soon as the damper $c$ is hot it is lowered by operating its screw 8 so as to bring the passage through the damper $c$ in register with that through the block $d$ of refractory material and that from the hearth, and then molten glass flows into and fills the reservoir $l$ of the portable apparatus, and the forming of a plate or sheet of glass can be effected in the manner hereinbefore described.

The velocity of the passage of the glass through the slot in the refractory material above the reservoir can be regulated by operating the screw-jacks $g$ at the base of the apparatus so as to raise or lower the apparatus. The furnace $f$ at the lower part of this portable apparatus allows the fluidity of the glass to be regulated and the base of the annealing apparatus, if used, to be heated, besides heating the damper so as to melt any glass adhering to it and the hearth whenever it is wished to shift the whole apparatus.

It is obvious that in this apparatus asbestos rolls could be used instead of the endless belt 3 coated with asbestos.

Having thus described and ascertained the nature of my invention and in what manner the same may be performed, I declare that what I claim is—

1. In an apparatus for upwardly drawing a continuous sheet of glass, the combination with a glass-melting furnace having a feeding-aperture with controlling means, of a reservoir movable vertically and horizontally and fed from said furnace, the said reservoir being heated by means independent of the furnace and provided at its upper part with an elongated slot, and means for drawing up the continuous sheet of glass, substantially as described.

2. In an apparatus for upwardly drawing a continuous sheet of glass, the combination with a glass-melting furnace having a feeding-aperture with controlling means, of a reservoir movable vertically and horizontally and fed from said furnace, the said reservoir being heated by means independent of the furnace and provided at its upper part with an elongated slot, two endless belts or carriers consisting of metallic wire-gauze coated with asbestos, two pairs of rotary rolls situated at the foot and upper part of the apparatus and over which the endless belts are trained, drawing-rolls, and means for automatically controlling the drawing-rolls for bringing them nearer to one another and causing the endless belts to be pressed against the drawn sheet of glass, substantially as described.

3. In an apparatus for upwardly drawing a continuous sheet of glass, the combination with a glass-melting furnace having a feeding-aperture with controlling means, of a reservoir movable vertically and horizontally and fed from said furnace, the said reservoir being heated by means independent of the furnace and provided at its upper part with an elongated slot, endless belts consisting of metallic wire-gauze coated with asbestos, two pairs of rolls situated at the foot and upper part of the apparatus and having the belts trained thereover, and a plurality of rolls operating to press the belts against the continuous sheet of glass, substantially as described.

In testimony whereof I have hereunto set my hand in presence of two subscribing witnesses.

EMILE FOURCAULT.

Witnesses:
AUGUSTE HAUG,
LUCIEN QUINEL.